June 27, 1967   G. M. OLSON   3,328,088
DUAL ATTACHMENT
Filed Sept. 8, 1965

INVENTOR
GLENN M. OLSON
BY
Williamson & Palmatier
ATTORNEYS

United States Patent Office 3,328,088
Patented June 27, 1967

3,328,088
DUAL ATTACHMENT
Glenn M. Olson, 1912 6th Ave. N.,
Grand Forks, N. Dak. 58201
Filed Sept. 8, 1965, Ser. No. 485,827
3 Claims. (Cl. 301—36)

This invention relates to tractors and more specifically to a mounting device for permitting a dual wheel to be readily mounted on the regular rear wheel of a tractor.

An object of this invention is to provide a novel wheel mounting device, of simple and inexpensive construction, for use in readily mounting a dual wheel on the conventional rear wheel of a tractor to increase the traction of the tractor during operation thereof.

A more specific object of this invention is the provision of a wheel mounting device for use in permitting ready mounting on the conventional rear wheel of a tractor, of a dual wheel of different size than the conventional regular rear wheel, whereby the tractor may be quickly converted from single to rear dual wheel support and drive.

Figure 1:
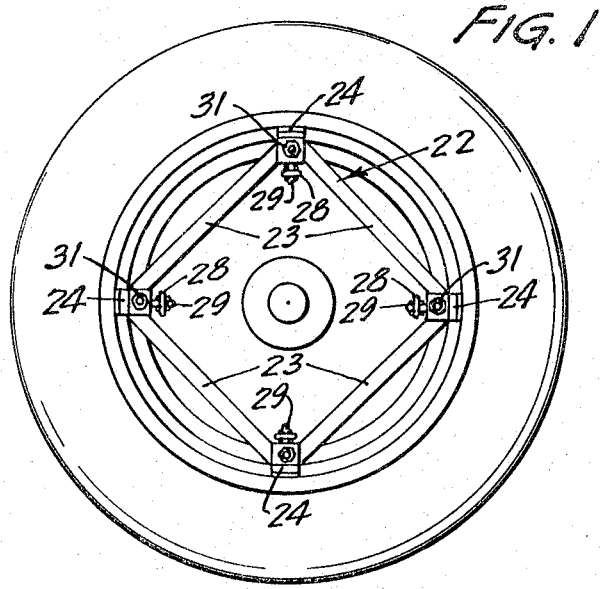
Figure 3:
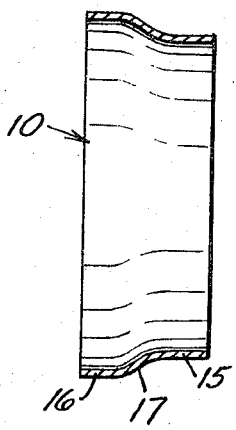
Figure 2:
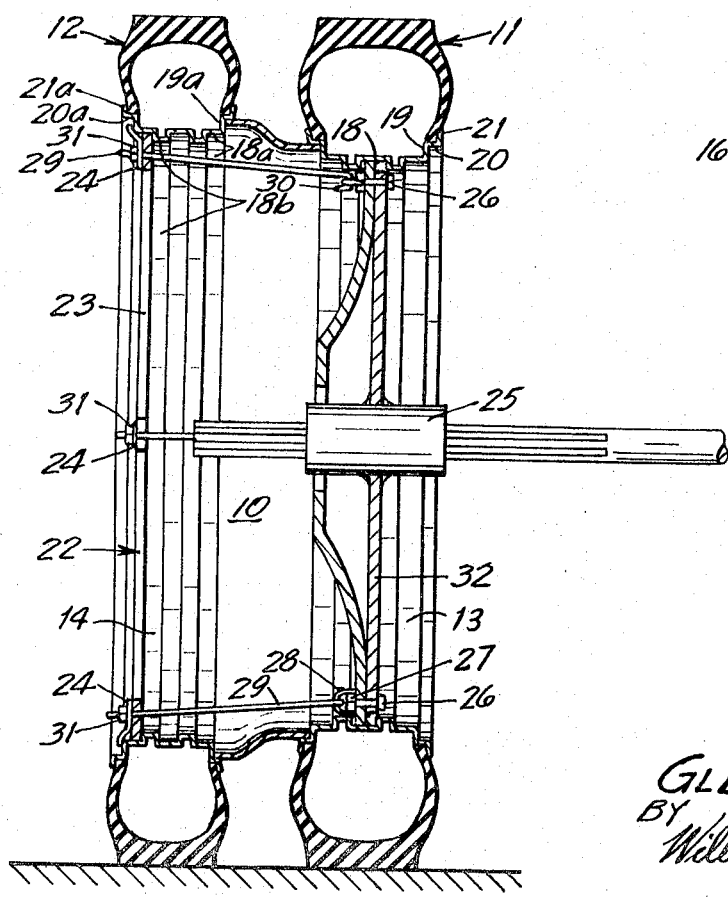

These and other objects and advantages of this invention will more fully appear from the following description made in connection with the accompanying drawings wherein like character references refer to the same or similar parts through the several views, and in which:

FIG. 1 is a side elevational view of the rear dual wheels of a tractor incorporating the mounting device, and FIG. 2 is a vertical sectional view of FIG. 1 taken approximately along line 2—2 and looking in the direction of the arrows, and FIG. 3 is a cross-sectional view of the mounting device.

Referring now to the drawings it will be seen that one embodiment of the novel mounting device designated generally by the reference numeral 10 is shown in interconnecting relation with a pair of rear dual wheels of a conventional tractor. To this end, it is pointed out that the regular rear wheel associated with a tractor is designated generally by the reference numeral 11 while the extra or dual wheel is designated generally by the reference numeral 12. In the embodiment shown, the rim of the regular wheel 11 has a diameter smaller than the rim of the outer or dual wheel, the dual wheel having a smaller or narrower width dimension than the regular wheel.

It is desirable under certain circumstances to use rear dual wheels on the tractor especially when the tractor is used in conjunction with farming and during the early spring plowing, cultivation and the like when the soil is often very moist. Through the use of dual wheels, better traction may be developed and the increased surface area permits the tractor to be buoyed up or float as it traverses the moist soil. It is also desirable in many instances, when converting the tractor from single rear wheel to dual rear wheels to use a relatively narrow wheel as the dual wheels since this narrower wheel may be used in place of the regular tractor wheels at some later time for example during a cultivation operation. Under these circumstances it is desirable to use narrow wheels which very nicely fit between the rows or plants to be cultivated. However, when a different size wheel is used, these extra wheels have rims which are slightly larger than the rim of the regular tractor wheel and it is through the use of my mounting device 10 that wheels of different sizes may be mounted in dual relationship.

It will be noted that the wheel rim 13 of the regular wheel 11 is of smaller diameter than the wheel rim 14 of the extra or dual wheel 12. In the embodiment shown, the wheel rim 13 has a diameter of approximately 34 inches and the wheel rim 14 has a diameter of approximately 38 inches. It will be seen that my novel mounting device 10 extends between and is disposed in engaging relation with the wheel rims 13 and 14 respectively.

This mounting device 10 is of generally bell shape configuration and includes a first cylindrical rim-engaging portion 15 and a second cylindrical rim-engaging portion 16 concentric with but of larger diameter than the first cylindrical portion 15. It will be noted that the respecive end rim-engaging cylindrical portions 15 and 16 respectively are interconnected by an intermediate generally frustoconical portion 17 which is integrally formed with these end cylindrical portions.

The wheel rims 13 and 14 are of conventional construction and it will be noted that each is therefore of generally channel-shaped configuration. The wheel rim 13 includes a web portion 18 having inner upturned annular flanges 19 integrally formed with the peripheral edges thereof and to which is secured slightly inwardly tapered transverse flanges 20 and upon which the beads of the tire T associated therewith is positioned. The outer peripheral edges of the transverse flanges 20 have outer upturned flanges 21 integrally formed therewith and which also engage and retain the beads of the tire thereagainst. It will be noted that the transverse flanges 20 while being disposed substantially parallel with respect to the axis of the associated wheel rim, these flanges do taper slightly inwardly toward each other.

The wheel rim 14 also includes a web portion 18a to which is secured inner upturned flanges 19a. Transverse flanges 20a are integrally formed with flanges 19a and flare slightly outwardly therefrom in the manner of flanges 20. Upturned annular flanges 21a are integrally formed with flanges 20a and cooperate therewith for retaining the beads of the tire T thereagainst.

When the mounting device 10 is interposed in engaging relation with respect to the wheel rims 13 and 14, it will be seen that the first cylindrical portion 15 has its outer peripheral surface disposed in engaging relation with respect to the inner peripheral surface of the outer transverse flange 30 of the wheel rim 13. Similarly, the second cylindrical portion 16 has its outer surface disposed in engaging relation with the inner peripheral surface of the inner transverse annular flange 20a of the wheel rim 14. Since the respective rim engaging end portions of the mounting device are of cylindrical configuration, and since the transverse flanges of the wheel rims which are engaged by the mounting device are of slightly tapered configuration, the mounting device will engage the respective wheels with interlocking effect. Thus the dual wheel is very effectively mounted on the rear tractor wheel for rotation therewith.

Means are provided for retaining the wheels in interlocked spaced relationship and this retaining mechanism includes a generally rectangular shape locking frame 22. The frame 22 includes four frame elements 23 each of angle construction and joined together at their respective ends. This locking frame 22 is positioned against the inner surface of the web portion 18a of the dual wheel and against the outer surface of one of the small channel shaped annular protuberances 18b of the web portion 18a as best seen in FIG. 2. The locking frame is provided with four generally rectangular shaped angularly bent reinforcing gussets 24 each provided with an aperture therein and each secured to the joint between adjacent frame elements 23. The wheel disc 25 of the regular tractor wheel 11 is provided with apertures thereon for receiving conventional mounting lugs 26 therethrough and which are carried by the axle hub 32 of the tractor. The regular lock nuts, associated with four of these lugs, are removed and are replaced with locking nuts 27 each of which is provided with an annular engagement or retaining ring 28 integrally formed therewith. Elongate hook bolts 29 each of which are bent at one end to define hooks 30 thereat have their respective hooks 30 engaged by the retaining rings 28 and the other end of the bolts which are threaded project through the apertures in the reinforcing gussets 24 and each hook 29 is engaged by a nut 31. It will be seen that by tightening the nuts 31, the respective wheels are urged into tighter engaging relation with respect to the mounting device 10. With this arrangement, disengagement of the wheels from the mounting device is completely prevented.

When my mounting device is used to convert the single rear wheels of a tractor to a dual wheel arrangement, the user first merely removes four of the conventional lug nuts that are used to mount the wheel disc 25 on the hub 32 of the tractor wheel axle and replaces these lug nuts with the lug nuts 27. Thereafter the mounting device 10 is mounted on the inner or regular tractor wheel 11 so that the first cylindrical portion 15 thereof engages the inner surface of the outer transverse annular flange 20 of the wheel rim 13. Thereafter the dual wheel 12 is positioned against the mounting device 10 so that the second cylindrical portion 16 of the mounting device 10 engages the inwardly facing transverse annular flange 20a of the wheel rim 14. The hook bolts 29 are then hooked into engaging relation with respect to the retaining rings 28 and the locking frame is then positioned against the outer surface of the wheel rim 14. The free threaded ends of the bolts 29 will then be passed through the apertures in the gussets and locking frame 22 and these threaded ends will then be engaged by the nuts 31.

As the nuts 31 are tightened, the adjacent transverse flanges 20 and 28 of the wheel rims 13 and 14 will be urged into tightly interlocked relationship with respect to the cylindrical rim-engaging end portions of the mounting device 10. It will therefore be seen that the entire operation of the mounting of the dual wheel on the regular tractor wheel may be very quickly and easily accomplished. It has been found that the specific cooperative relation between the cylindrical end portions of the mounting device 10 and the slightly tapered transverse flange portions of the wheel rim completely preclude relative rotation of one of the dual wheels relative to the other wheel. It has been found that even in working in very moist soil, not only is traction of the tractor improved by the use of dual wheels, but the imperforate mounting device 10 also tends to minimize any tendency of the rear wheels to sink deeply into the soil.

It will further be noted that by utilizing substantially cylindrical end portions on the mounting device, the mounting operation is more easily accomplished since the end cylindrical portions of the mounting device will always be maintained in substantially coaxial relation with respect to the axis of the inner connected wheels.

Thus it will be seen that I have provided a novel mounting device which is not only of simple and inexpensive construction but one which functions in a more efficient manner than any heretofore known comparable device.

It will, of course, be understood that various changes may be made in the form, details, arrangement and proportions of the various parts without departing from the scope of my invention.

What we claim is:

1. In a rear dual wheel device for a tractor, a pair of tire-mounted rear wheels arranged in side-by-side coaxial relation and each wheel having an exterior diameter substantially the same size as the other wheel, each wheel including a wheel rim, one of said wheel rims having a greater diameter than the diameter of said other wheel rim, each of said wheel rims including an annular web portion having an outturned annular flange integrally formed therewith and extending radially therefrom, a transverse flange integrally formed with said outturned annular radial flange and extending substantially axially therefrom, a one-piece mounting structure including a generally cylindrical first rim engaging portion engaging the inner surface of the annular transverse axially extending flange of the inner wheel rim in interlocked relation therewith, an intermediate portion integrally formed with said first rim engaging portion and flaring axially and outwardly therefrom, a generally cylindrical second rim engaging portion having a diameter greater than said first rim engaging portion and being integrally formed with said intermediate portion, said second rim engaging portion being engageable with the inner surface of the annular transverse axially extending flange of the outer wheel rim in interlocked relation therewith, and releasable locking means spaced from said mounting structure and extending between and releasably engaging said wheel rims for retaining said mounting structure in interlocked relation with said wheel rims.

2. The mounting device as defined in claim 1 wherein said intermediate portion is of frusto conical configuration.

3. The mounting device as defined in claim 2 wherein said mounting structure is of imperforate construction.

References Cited
UNITED STATES PATENTS

| | | | |
|---|---|---|---|
| 1,190,537 | 7/1916 | Fry | 301—36 |
| 1,327,607 | 1/1920 | Baker. | |
| 1,689,968 | 10/1928 | Pounds | 301—36 |
| 3,082,040 | 3/1963 | Degerness | 301—36 |
| 3,237,992 | 3/1966 | Kiesau et al. | 301—36 |

FOREIGN PATENTS 629,515    7/1927    France.

BENJAMIN HERSH, *Primary Examiner.*

RICHARD J. JOHNSON, *Examiner.*